(12) United States Patent
Saeki (10) Patent No.: US 7,274,812 B2
(45) Date of Patent: Sep. 25, 2007

(54) IMAGE PROCESSING DEVICE AND METHOD

(75) Inventor: Kazuhito Saeki, Osaka (JP)

(73) Assignee: Keyence Corporation, Osaka (JP)

( * ) Notice: Subject to any disclaimer, the term of this patent is extended or adjusted under 35 U.S.C. 154(b) by 874 days.

(21) Appl. No.: 10/649,308

(22) Filed: Aug. 27, 2003

(65) Prior Publication Data

US 2004/0041907 A1    Mar. 4, 2004

(30) Foreign Application Priority Data

Aug. 28, 2002    (JP) .............................. 2002-248905

(51) Int. Cl.
  *G06K 9/00*    (2006.01)
  *H04N 7/18*    (2006.01)
(52) U.S. Cl. .................. 382/141; 356/237.1; 356/426; 438/16; 29/833; 348/125; 348/86
(58) Field of Classification Search ........ 382/141–152; 348/86–95, 125–134; 700/95–212; 29/833; 438/16; 356/237.1–237.6, 426–431
  See application file for complete search history.

(56) References Cited

U.S. PATENT DOCUMENTS

| | | | | |
|---|---|---|---|---|
| 5,991,041 | A * | 11/1999 | Woodworth | 356/602 |
| 6,160,910 | A * | 12/2000 | Freifeld | 382/154 |
| 6,175,644 | B1 * | 1/2001 | Scola et al. | 382/141 |
| 6,175,652 | B1 * | 1/2001 | Jacobson et al. | 382/216 |
| 6,320,609 | B1 * | 11/2001 | Buchanan et al. | 348/126 |
| 6,493,079 | B1 * | 12/2002 | Piacentini | 356/240.1 |
| 6,970,588 | B1 * | 11/2005 | Komatsu | 382/141 |
| 7,084,900 | B1 * | 8/2006 | Watanabe et al. | 348/94 |
| 7,177,459 | B1 * | 2/2007 | Watanabe et al. | 382/151 |
| 2004/0041907 | A1 * | 3/2004 | Saeki | 348/135 |

FOREIGN PATENT DOCUMENTS

| | | |
|---|---|---|
| JP | 05-126754 | 5/1993 |
| JP | 05-259700 | 10/1993 |
| JP | 05-292503 | 11/1993 |
| JP | 2001-108625 | 4/2001 |
| JP | 2001-153625 | 6/2001 |

* cited by examiner

*Primary Examiner*—Bhavesh M Mehta
*Assistant Examiner*—Aaron W Carter
(74) *Attorney, Agent, or Firm*—Kilyk & Bowersox, P.L.L.C.

(57) ABSTRACT

In an image processing device capable of collectively estimating an object based upon results of plural times of inspection, regions (1(1)) and (1(2)) to be photographed are defined on opposite end portions of an object (w). When an image of the left end portion of the object (w) is captured in response to a first trigger, the image processing device acquires corresponding image data, and the length (x1) of a projection extending in the x-direction at the left end of the object (w). When an image of the right end portion of the object (2) is next captured in response to a second trigger, the image processing device captures corresponding image data and measures the length (x2) of a projection extending in the x-direction at the right end of the work (w). Thereafter, the device finds the sum (x1+x2) of the lengths (x1, x2) inside, and outputs a result externally.

10 Claims, 11 Drawing Sheets

| Number of Triggers | Trigger Number | | | | |
| --- | --- | --- | --- | --- | --- |
| | 1 | 2 | 3 | 4 | ... |
| 1 | GR1 | | | | |
| 2 | GR1 | GR2 | | | |
| 3 | GR1 | GR2 | GR3 | | |
| 4 | GR1 | GR2 | GR3 | GR4 | |
| ... | GR1 | GR2 | GR3 | GR4 | GR5 |

IMAGE PROCESSING DEVICE AND METHOD

BACKGROUND OF THE INVENTION

1. Field of the Invention

This invention relates to an image processing device and method.

2. Related Background Art

Conventional image processing devices are configured to output the result of analysis each time after execution of a unit of jobs on an image, namely, acquiring image data on the single image from a camera, processing and inspecting the acquired image data.

Figure 1:
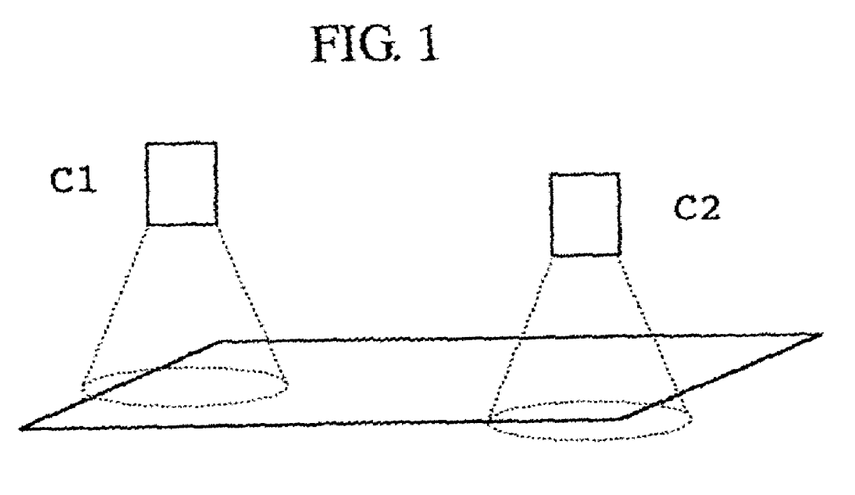
FIG. 1 is a diagram for explaining a conventional method of inspection of a relatively large-sized object.

Therefore, as shown in FIG. 1 for example, in case an object of a large size needs inspection of some portions thereof discrete over a region beyond the coverage by the field of view of a single camera, it is necessary to use two or more cameras C1, C2 to acquire image data of such portions to be examined from respective cameras.

However, since any image processing device has only a limited number of connectors for cameras, image processing devices of this type cannot cope with inspection of objects requiring more cameras than the maximum number connectable to a single image processing device.

Figure 2:
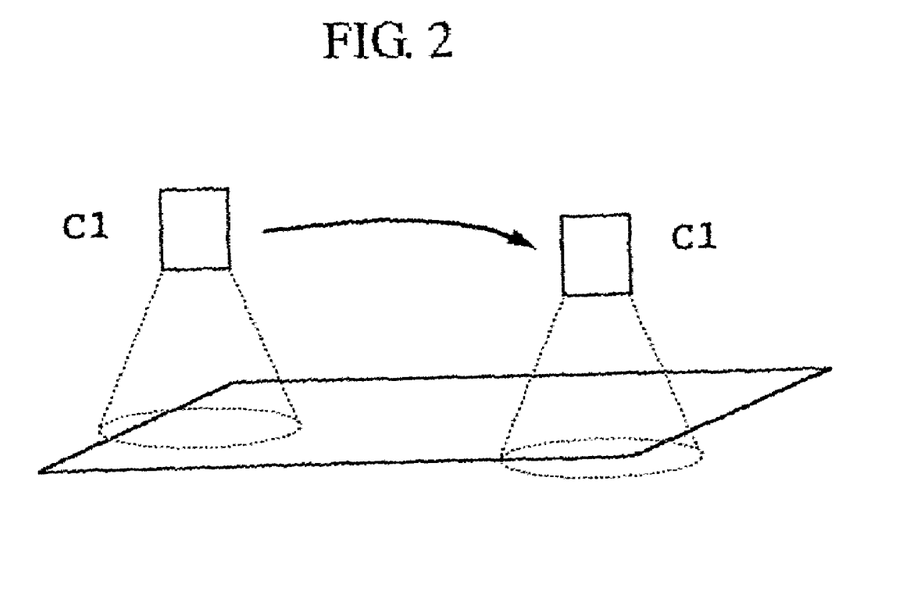
FIG. 2 is a diagram for explaining another conventional method capable of overcoming a disadvantage of the conventional method shown in FIG. 1 in case of inspection of a relatively large-sized object.

This inconvenience is overcome if relative movement is possible between one or more cameras and an object to be examined as shown in FIG. 2, for example, in which a single camera C1 is shown as being moved from one portion to another. In this case, the image processing device can sequentially acquire and inspect images of different positions of the object from the camera or cameras in response to triggers generated inside or introduced from outside in predetermined time intervals.

Both these methods, however, cannot treat results of inspection obtained by a plurality of times of inspection of a single object or a plurality of identical objects to collectively estimate the entire acceptability, quality, etc. of the object or identical objects.

SUMMARY OF THE INVENTION

It is therefore an object of the invention to provide an image processing device and an image processing method capable of collectively estimating an object based upon a plurality of times of inspection.

A further object of the invention is to provide an image processing device and an image processing method capable of collectively estimating a large-sized object not covered by the field of view of a camera.

A still further object of the invention is to provide an image processing device and an image processing method capable of collectively estimating a plurality of identical objects.

In order to achieve the above objects, the invention is characterized in executing collective estimation after completing a plurality of times of acquisition of image data from a camera and a plurality of times of image processing of individual pieces of image data.

One camera or a plurality of cameras may be used to obtain image data on a plurality of portions of one or more objects to be examined.

DETAILED DESCRIPTION OF THE INVENTION

Figure 3:
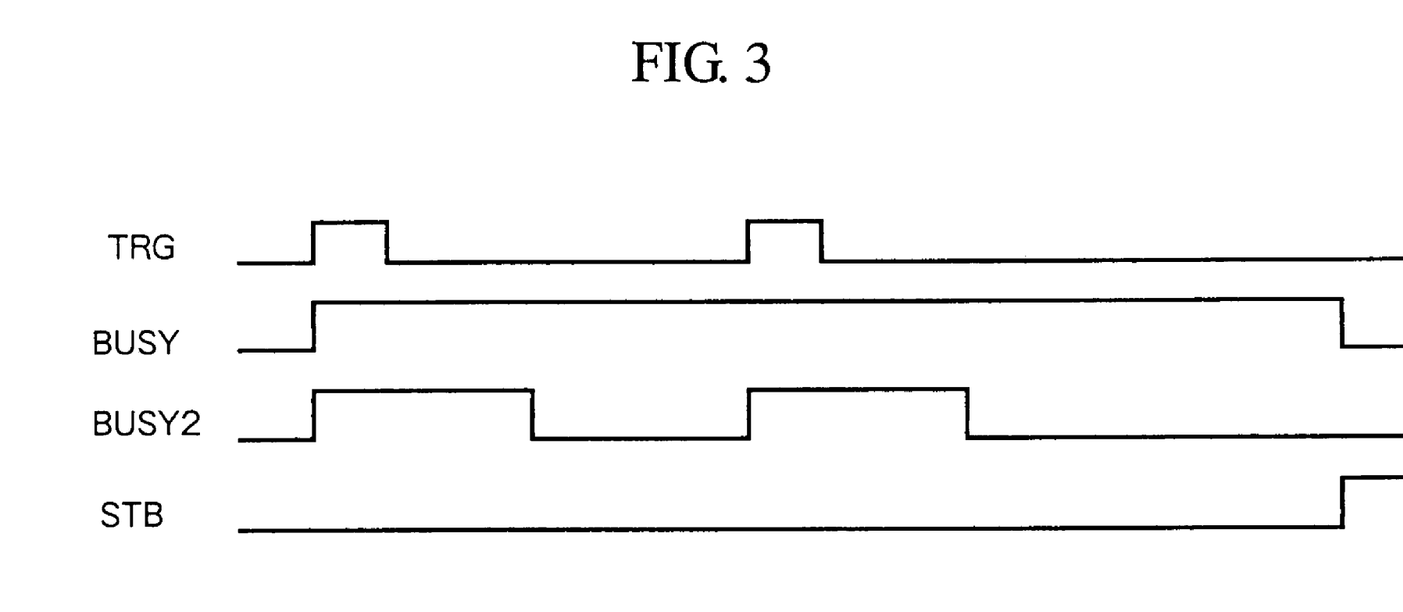
FIG. 3 is a timing chart for explaining procedures in an embodiment of the invention.

FIG. 3 is a timing chart showing procedures of photographing an object twice with a single camera in a method according to an embodiment of the invention. In FIG. 3, TRG shows the timing of inputting triggers, BUSY shows the timing of a unit of jobs in a single inspection task on a set of images of one or more objects, BUSY2 shows the timing of acquiring image data, and STB shows the timing of outputting a result of collective estimation. The camera is driven to obtain the first image in response to the first trigger at the timing shown by TRG. Responsively, an image processing device acquires image data of the first image from the camera at the timing shown by BUSY2 and carries out inspection including arithmetical operation of the data values. Thereafter, the camera and/or the object are moved to the next relative position, and the camera is driven to obtain the second image in response to the second trigger at the timing shown by TRG. Responsively, the image processing device acquires the image data of the second image from the camera at the timing shown by BUSY2 and carries out inspection including arithmetical operation of the data values. After completion of the inspection of the second image data, the image processing device carries out collective estimation of the object, based upon the result of the first inspection and the result of the second inspection, and outputs the result of the collective estimation to a display of the image processing device or an external device at the timing shown by STB. Thereafter, the image processing device erases the first and second image data, related data values, and so on. In case two cameras are prepared and connected to the image processing device, the first camera may be used to obtain the first image, and the second camera may be used to obtain the second image.

Figure 4:
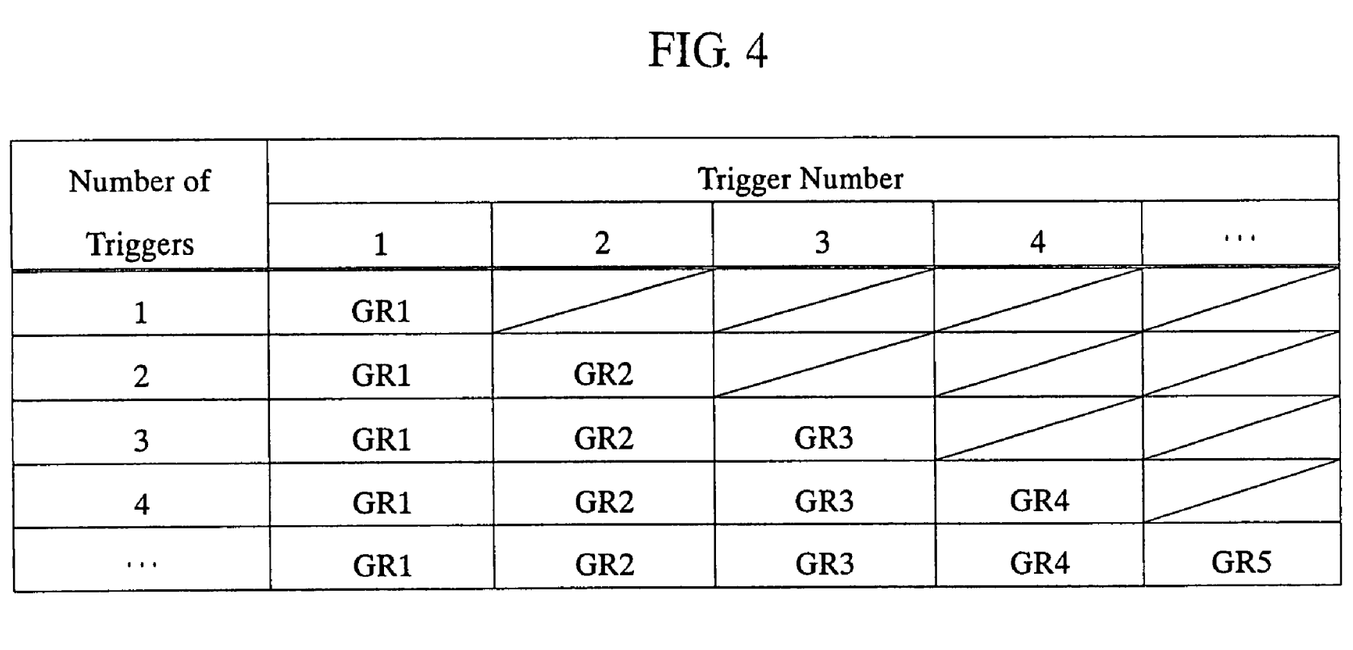
FIG. 4 is a diagram for explaining an example of registration of a user's optional setting according to an embodiment of the invention.

It is desirable to permit users to set any desired number of shots by the camera, i.e. the number of triggers for the camera to-obtain images. Additionally, it is preferable to permit a user to set any kinds of inspection groups combining conditions or contents of inspection beforehand, and to assign any desired inspection group to a particular trigger number. For example, an inspection group GR1 may be assigned to an n-th trigger, and the same inspection group GR1 or different inspection group GR2, for example, may be assigned to the next trigger number. Examples of the conditions or contents of inspection include positions of an object or objects to be examined. That is, the term "inspection group" herein means a combination of inspection items for a single target image. The term "inspection (measurement)" means a kind of designated inspection or a set of designated kinds of inspection to be executed on a pattern formed by one or more windows set on each target image. FIG. 4 shows an example of registration of such user's optional setting. In FIG. 4, if the number of triggers is 3, inspection of the first group GR1 is executed in response to the first trigger; inspection of the second group GR2 is executed in response to the second trigger; and inspection of the third group GR3 is executed in response to the third trigger.

Figure 5:
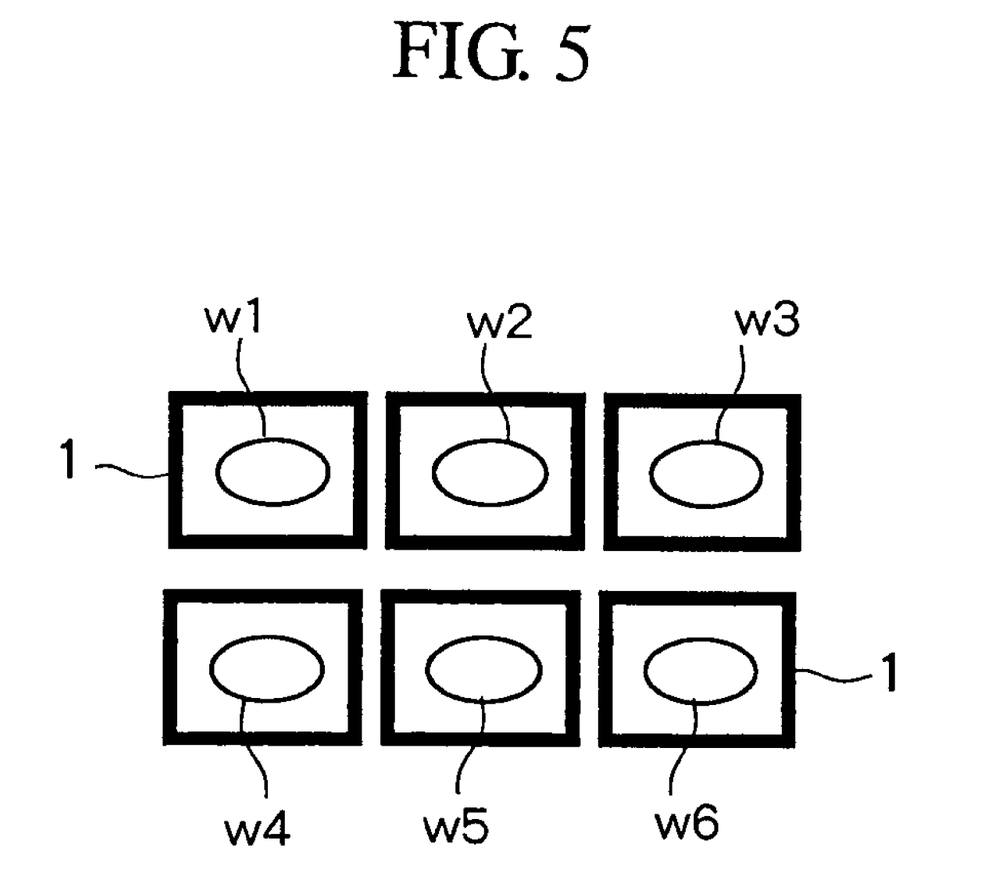
FIG. 5 is a diagram for explaining that an embodiment of the invention is effective for collective estimation of a plurality of identical objects.

FIG. 5 shows a rather concrete example of inspection. Here is carried out identical inspection of a plurality of identical objects w, which may be products of a common lot, each having a size fully covered by the field of view of a camera. In this example, six identical objects w1 through w6 are shown. After inspection of the final one of these objects, results of six times of inspection are collectively estimated, and a result of the collective estimation of all objects is output. In FIG. 5, reference numeral 1 denotes a target image. In the example of FIG. 5, if these steps and contents of inspection are registered by user's choice similarly to the user's optional setting of FIG. 4, then the number of triggers is 6, and one inspection group is assigned to all trigger numbers. Thus, all these identical objects w1 through w6 shown in FIG. 5 are examined by identical inspection, and are collectively estimated from results of six times of identical inspection.

Figure 6:
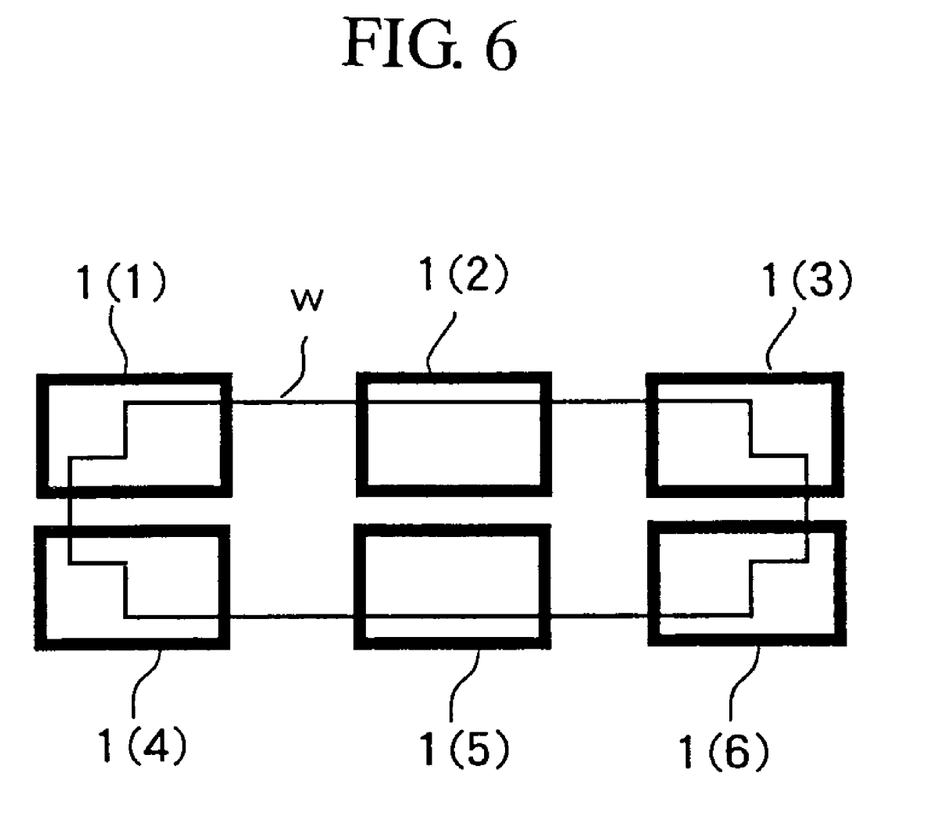
FIG. 6 is a diagram for explaining that an embodiment of the invention is effective for collective estimation of a relatively large-sized object by different kinds of inspection of different portions of the object.

FIG. 6 shows another example of inspection. Here is carried out different kinds of inspection of a relatively large-sized single object w having a plurality of portions to be examined, which are not covered entirely by the field of view of a camera. Different target images 1(1) through 1(6) of the object w are prepared, and corresponding image data undergo different items of inspection. After the inspection of image data on the target image 1(6) to be finally inspected, a result of collective estimation of the object w is output. If these steps and contents of inspection are registered by user's choice similarly to the user's optional setting of FIG. 4, the number of triggers is 6, and different inspection groups are assigned to the respective trigger numbers. Thus, the object can be examined by different kinds of inspection, and can be collectively estimated from results of six times of different kinds of inspection.

Figure 7:
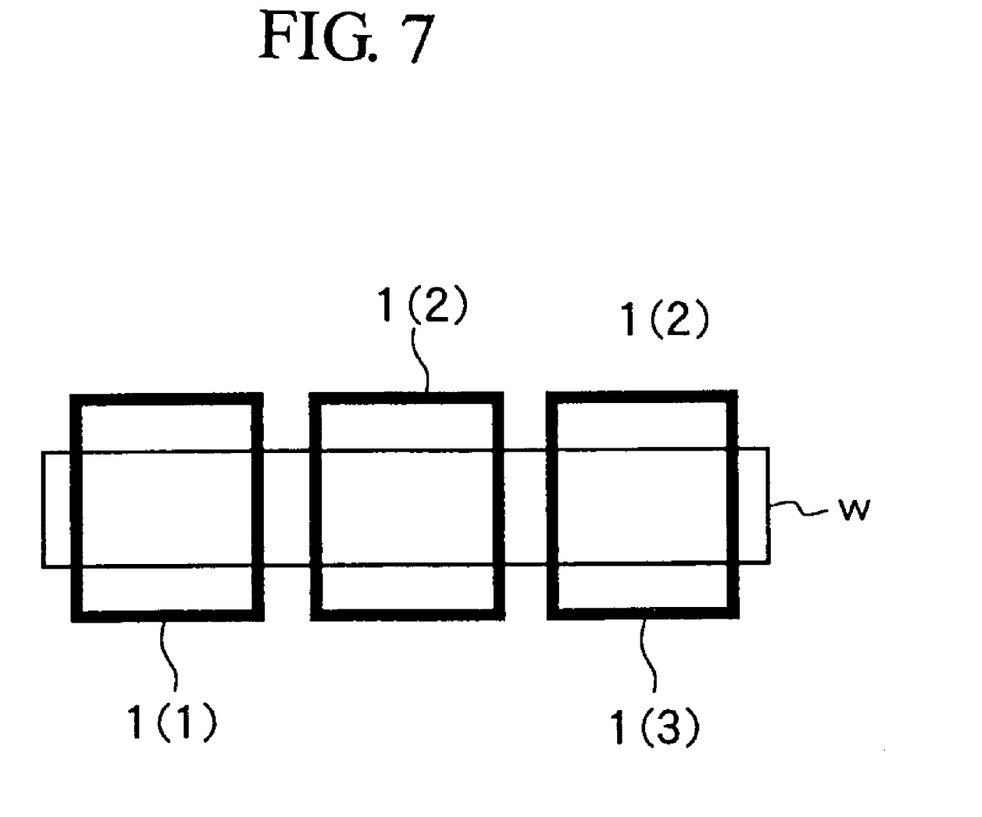
FIG. 7 is a diagram for explaining that an embodiment of the invention is effective when applied to collective estimation of an elongate object.
Figure 8:
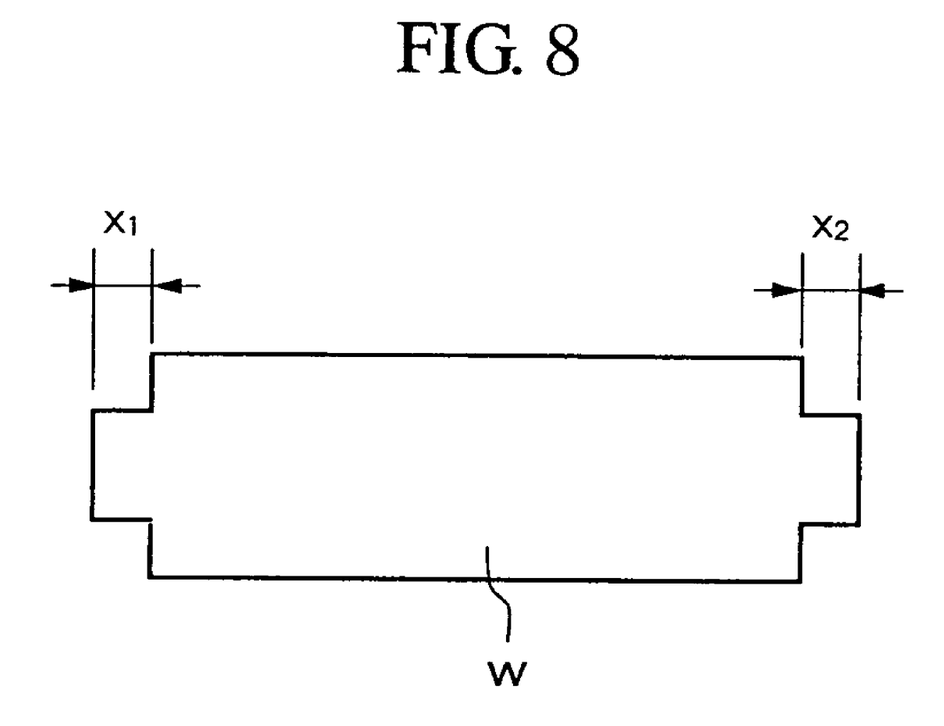
FIG. 8 is a diagram for explaining that an embodiment of the invention is effective for measuring the sum of lengths x1, x2 of projections extending in the x-direction at opposite ends of an object.

FIG. 7 shows another example of inspection. Here is taken an elongate single object w like a cable having a plurality of portions to be examined, which are not covered entirely by the field of view of a camera. The elongate object w is photographed a plurality of times while it moves aside a stationary camera. After inspection of a portion of the object w to be finally inspected for example, a result of collective estimation of the elongate object w is output. If these steps and contents of inspection are registered by user's choice similarly to the user's optional setting of FIG. 4, one inspection group (identical inspection) is assigned to respective trigger numbers of the triggers determined by the user. Thus, a plurality of timed of the inspection and the collective estimation can be carried out as explained above.

Next referring to FIGS. 8 through 11, inspection or measurement by internal processing of an image processing device according to an embodiment will be explained below. Here is shown a process for finding the sum of lengths x1, x2 of projections extending at opposite ends of a relatively long object w shown in FIG. 8, and outputting its result.

Figure 9:
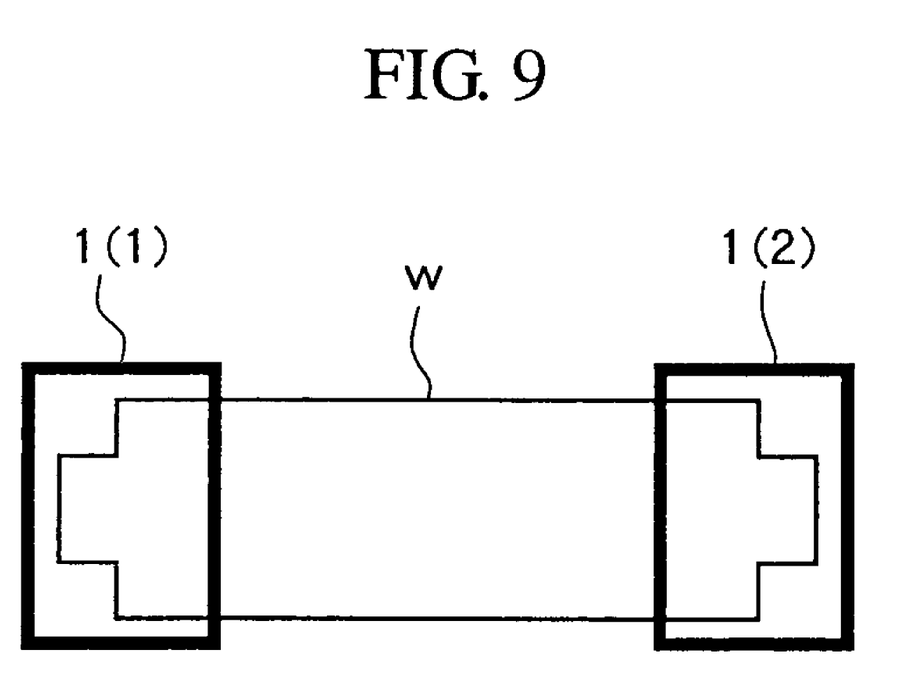
FIG. 9 is a diagram for explaining procedures of operation of an image processing device according to an embodiment of the invention for inspection of the object shown in FIG. 8.

As shown in FIG. 9, target images 1(1) and 1(2) of opposite end portions of the object w are prepared. A single camera may be used for obtaining required images of the object w, and either the camera or the object w may be moved to required relative positions.

Figure 10A:
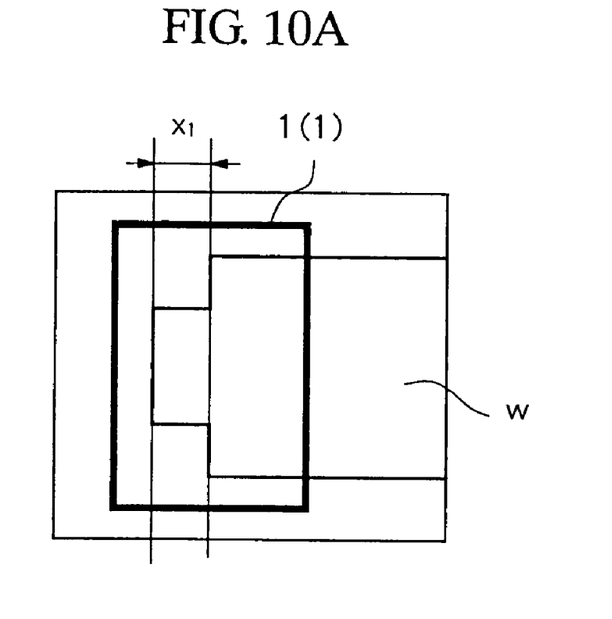
FIGS. 10A and 10B are diagrams for explaining a process for finding lengths of projections at opposite ends of the object shown in FIG. 8.
Figure 10B:
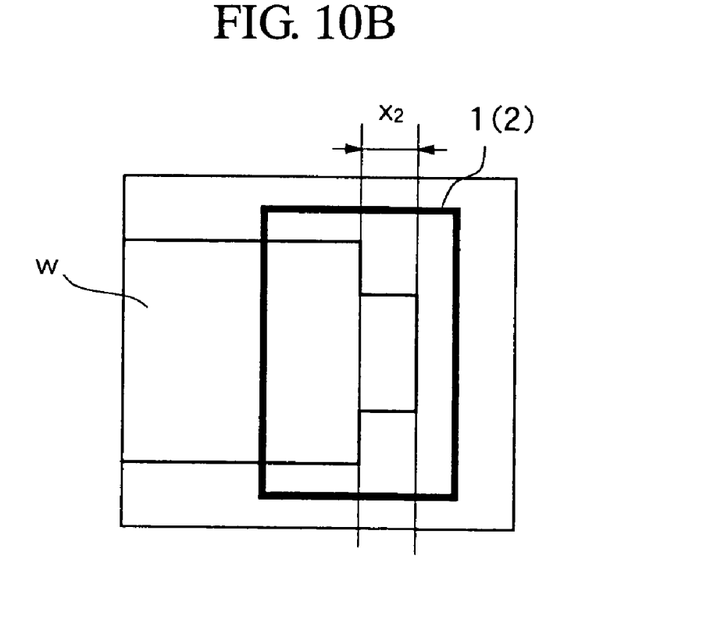

In response to a first trigger, the camera is driven to obtain a first image of the left end portion of the object w including the left projection, which is the first target image 1(1). Responsively, the image processing device acquires image data of the first target image. Thereafter, the image processing device measures the length x1 of the left projection extending in the x-direction at the left end of the object w as shown in FIG. 10A. In the next process, the camera is driven by a second trigger to capture a second image of the right end portion of the object w including the right projection, which is the second target image 1(2). Responsively, the image processing device acquires image data of the second image data 1(2). Thereafter, the image processing device measures the length x2 of the right projection extending in the x-direction at the right end of the object w as shown in FIG. 10B. After that, the image processing device totals x1 and x2 and obtains the value (x1+x2) inside.

Figure 11:
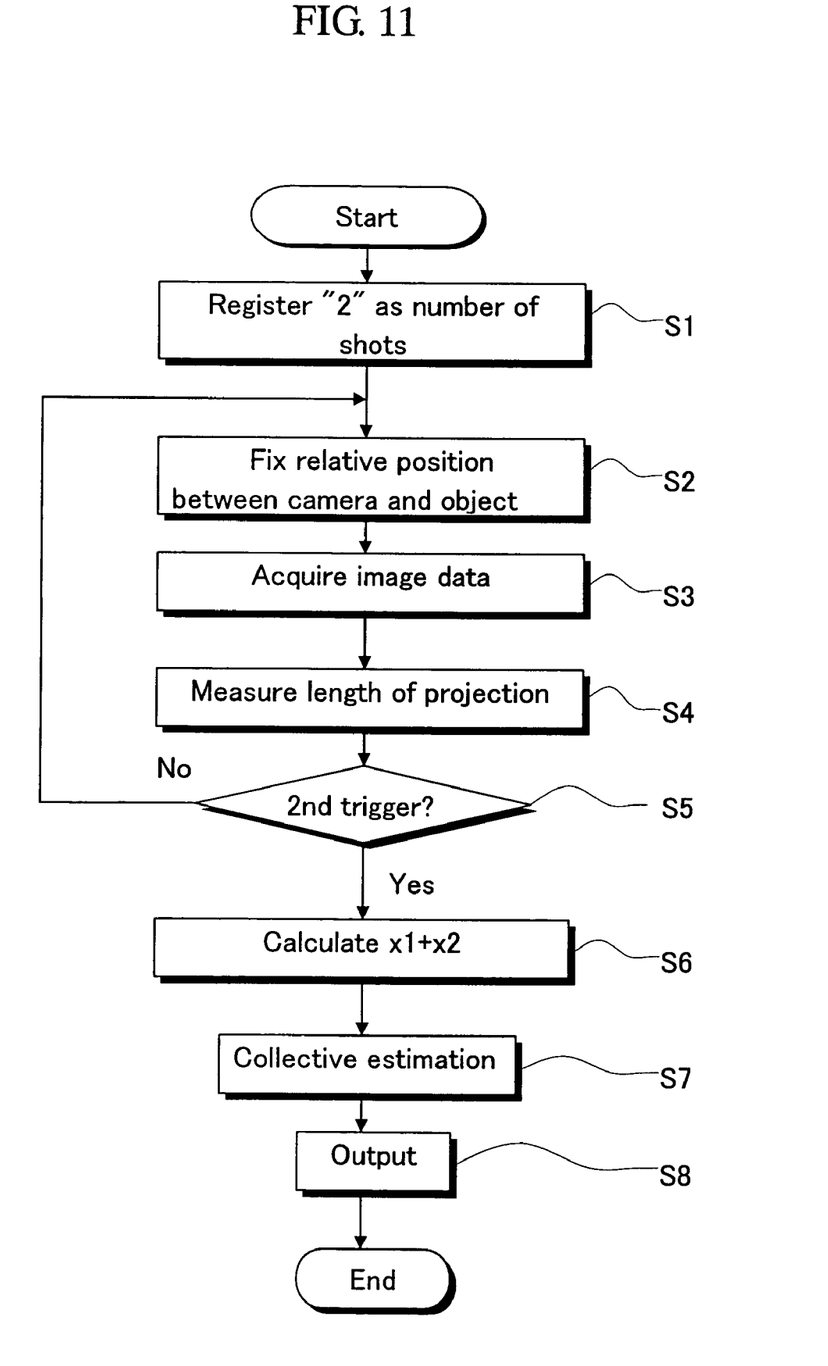
FIG. 11 is a flowchart for explaining procedures of operation of the image processing device according to the same embodiment.

With reference to FIG. 11, procedures of operation of the image processing device are explained in greater detail. In step S1, a user registers the optional setting of a necessary number of shots by the camera (number of triggers) and other required conditions for inspection, as already explained with reference to FIG. 4. That is, the user registers "2" as the number of triggers; assigns "GR1" to the first trigger and "GR2" to the second trigger; and designates "Inspection 1+Inspection 2" as the arithmetical operation.

In the next step S2, the object w or the camera is moved to a predetermined relative position to focus the camera onto the left end portion of the object 2. In the next step S3, the camera captures the first image of the left end portion of the object w, and the image processing device acquires image data of the first image. In the next step S4, the image processing device measures the length x1 of the left projection of the object w. In the next step 5, the device confirms whether the number of triggers has reached 2 or not, and returns to step S2 because the number of triggers is still 1. Thereafter, the steps S2 to S4 are repeated to establish relative positional relation between the object 2 and the camera for focusing the camera onto the right end portion of the object 2; drive the camera to capture the second image of the right end portion of the work; acquire the image data of the second target image from the camera; and measures the length X2 of the right projection of the object w.

After completion of the second measurement, the image processing device proceeds to the step S5 and further to the step S6, and calculates the final output value (Out) by addition of the lengths x1 and x2. Additionally, it compares the final output (Out) with a predetermined allowance (having the upper limit Max(Out) and the lower limit of Min (Out)).

That is, if the final output value satisfies Min(Out)≦Out≦Max(Out), the image processing device estimates that the object w is acceptable, and if the final output (Out) is not within the allowance, that is, if Out≦Min(Out) or Max(Out)≦Out, it estimates that the object w is not acceptable. After the estimation, the device outputs a result of estimation to a display of the device itself or an external device in step S8.

What is claimed is:

1. An image processing device for inspection by image processing of image data acquired from a camera which captures images of at least one object, comprising:

shot number setting means for setting the number of shots of photographing of the object with the camera;

inspection item setting means for setting at least one inspection item in association with individual ones of said shots, the at least one inspection item being selectable to be different for different of said shots;

preliminary inspection means for sequentially inspecting the image data acquired from the camera by image processing each time when the camera captures an image of the object based on the at least one inspection item until the number of shots reaches the value set by the shot number setting means;

collective estimation means for collectively estimating the object on the basis of results of inspection of image data of the individual images after inspection of image data of the image captured by final one of the shots determined by the shot number setting means; and output means for outputting a result of collective estimation by the collective estimation means.

2. The image processing means according to claim 1 wherein the preliminary inspection means carries out a predetermined identical inspection upon any of the shots.

3. The image processing means according to claim 1 wherein the preliminary inspection means carries out a plurality of predetermined different kinds of inspection inspects for the respective shots.

4. The image processing means according to claim 1 further comprising a data erasure means for erasing the image data acquired from the camera, results of inspection by the preliminary inspection means and the result of collective estimation after the output means outputs the result of the collective estimation of the object.

5. An image processing method comprising:

an inspection item setting step for setting at least one inspection item in association with individual images of an object captured by a camera, the at least one inspection item being selectable to be different for different of said images;

a preliminary inspection step for acquiring image data from the camera, carrying out image processing of the acquired image data and executing predetermined items of inspection based on the at least one inspection item each time when the camera captures an image of the object, and repeating these procedures predetermined times;

a collective inspection step for collectively inspecting the object on the basis of results obtained by a plurality of occurrences of the preliminary inspection step; and a collective result outputting step for outputting a result obtained in the collective inspection step.

6. The image processing method according to claim 5 further comprising a data erasing step for erasing the image data of the object, results of preliminary inspection obtained by a plurality of occurrences of the preliminary inspection step and the result of collective estimation obtained in the collective inspection step after the collective result outputting step.

7. The image processing method according to claim 6 wherein the images are captured by the camera from a plurality of identical objects contained in a single box, all of the objects are inspected by an identical item of inspection in any event of the preliminary inspection step.

8. The image processing method according to claim 6 wherein the images are captured by the camera from different portions of a single object, and the different portions of the single object are inspected in a plurality of events of the preliminary inspection step, respectively.

9. The image processing method according to claim 6 wherein the object is an elongate single object having first and second ends, and the first and second ends of the object are inspected in respective occurrences of the preliminary inspection step.

10. The image processing method according to claim 9 wherein the collective inspection step executes inspection of an error of the lengthwise size of the elongate object based upon the inspection of the first end second ends thereof in the preliminary inspection step.

* * * * *